(12) United States Patent
Hua et al.

(10) Patent No.: US 11,734,972 B2
(45) Date of Patent: Aug. 22, 2023

(54) SYSTEMS AND METHODS FOR SECURELY MANAGING VEHICLE INFORMATION

(71) Applicant: Rivian IP Holdings, LLC, Irvine, CA (US)

(72) Inventors: Rong Hua, San Carlos, CA (US); Suresh Koyya, Round Rock, TX (US); Thomas Minshull, Vancouver (CA); Namkai Michael Fairfield, San Rafael, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/534,672

(22) Filed: Nov. 24, 2021

(65) Prior Publication Data
US 2023/0162544 A1  May 25, 2023

(51) Int. Cl.
*G07C 9/00* (2020.01)
*H04L 9/00* (2022.01)
*H04L 9/32* (2006.01)
*H04L 9/08* (2006.01)

(52) U.S. Cl.
CPC .......... *G07C 9/00309* (2013.01); *H04L 9/006* (2013.01); *H04L 9/0819* (2013.01); *H04L 9/3247* (2013.01)

(58) Field of Classification Search
CPC ..... G07C 9/00309; H04L 9/006; H04L 9/088; H04L 9/32; H04L 9/3268; H04W 4/30; B60R 25/33; B60R 25/241
See application file for complete search history.

(56) References Cited

U.S. PATENT DOCUMENTS

| | | | | |
|---|---|---|---|---|
| 2014/0079217 A1* | 3/2014 | Bai | ..................... | H04L 9/3247 380/270 |
| 2018/0167367 A1* | 6/2018 | John | ..................... | H04L 9/3247 |
| 2022/0109561 A1* | 4/2022 | Yang | ..................... | H04L 9/3215 |

* cited by examiner

*Primary Examiner* — Vernal U Brown
(74) *Attorney, Agent, or Firm* — Haley Guiliano LLP

(57) ABSTRACT

Systems and methods are provided for securely managing vehicle information. A first digital signature associated with the vehicle may be generated based on a first public-private key pair, and a second digital signature associated with a mobile application may be generated based on a second public-private key pair. The mobile application may be associated with a mobile device operated by a user. The first digital signature and the public key of the first public-private key pair may be transmitted to, and stored by, the vehicle, and the second digital signature and the public key of the second public-private key pair may be transmitted to, and stored on the mobile device via the mobile application. The systems and methods may determine that a request to access the vehicle information has been received, and permit access to the vehicle information based on the first digital signature and the second digital signature.

20 Claims, 7 Drawing Sheets

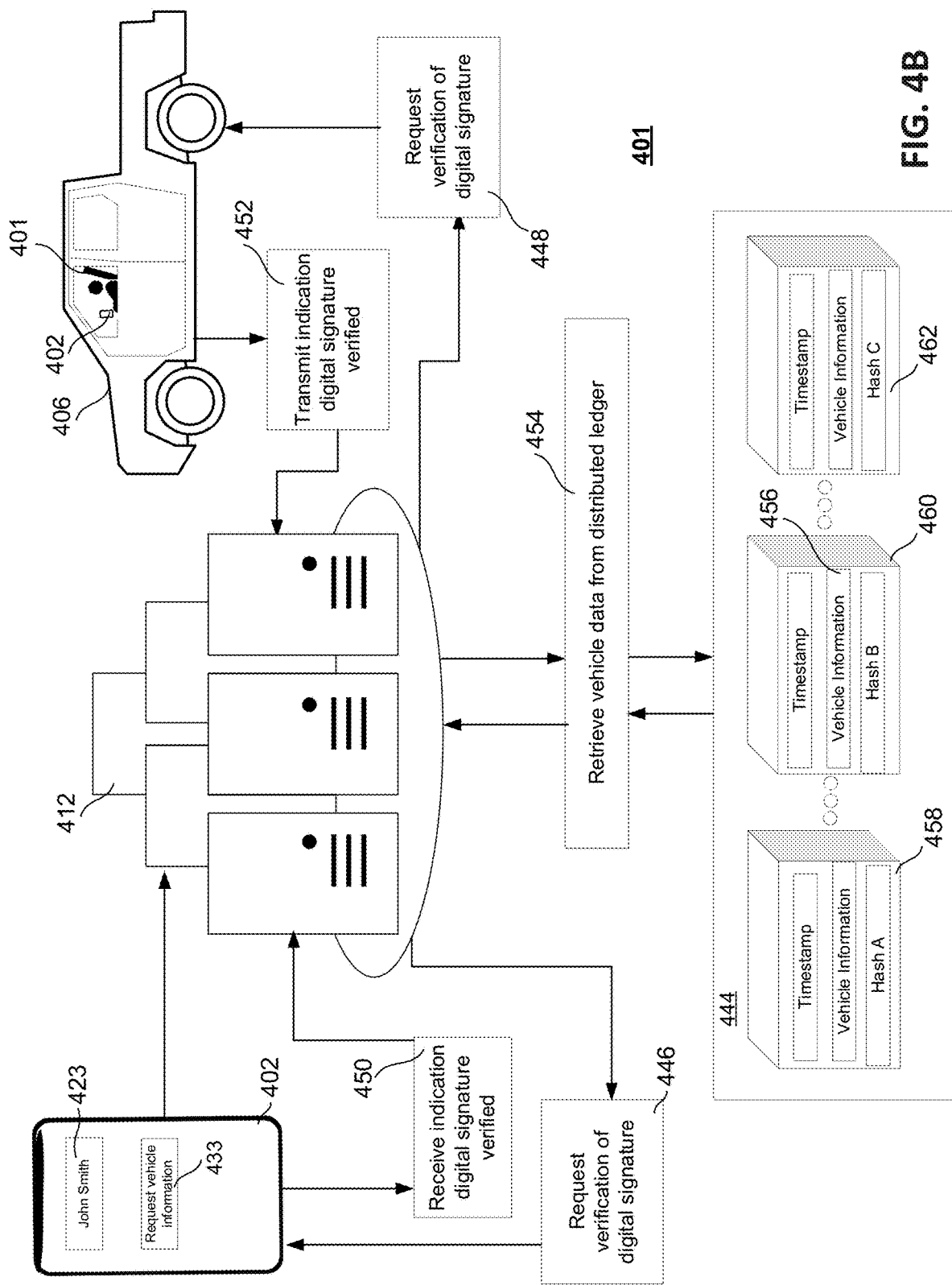

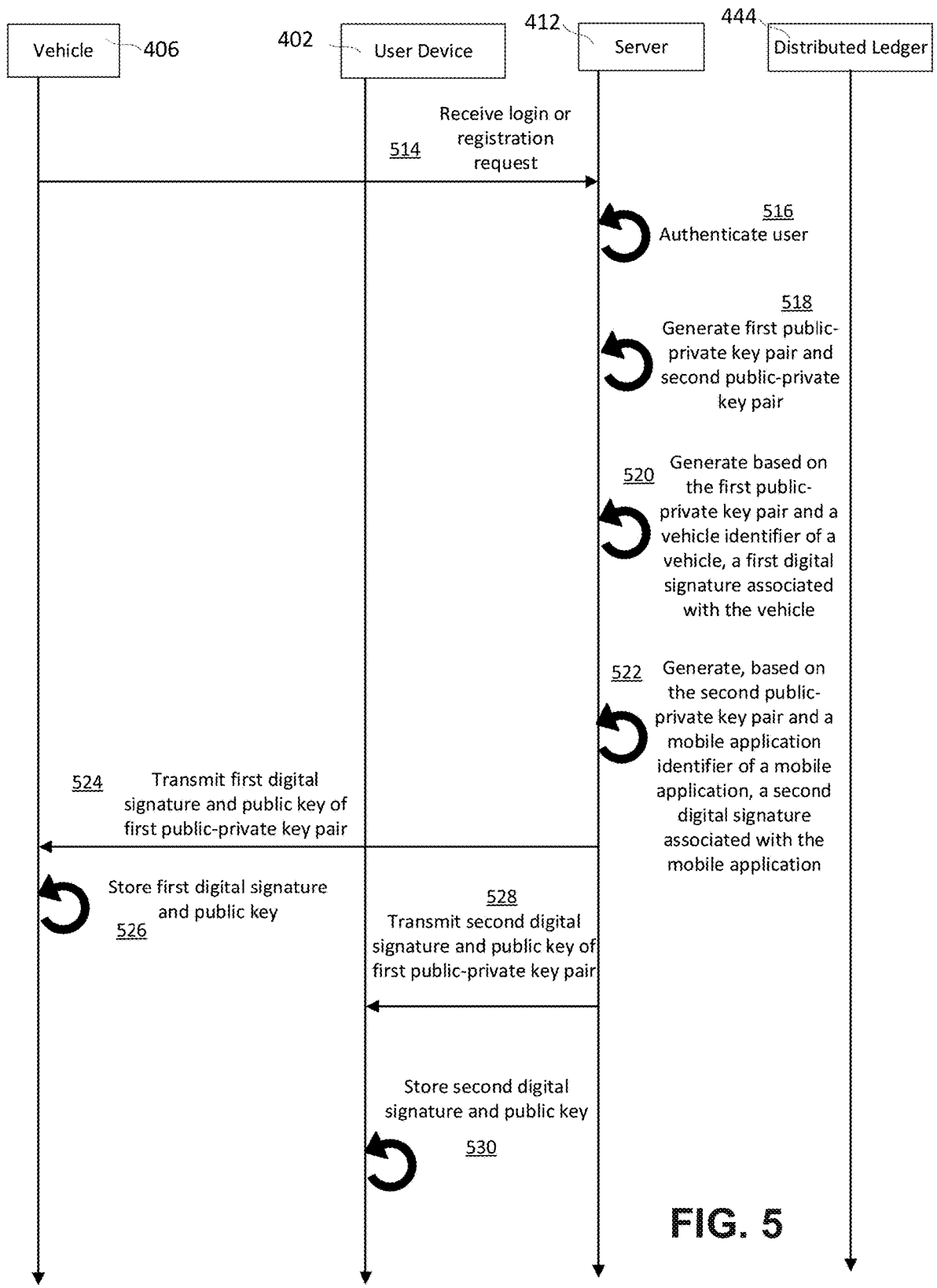

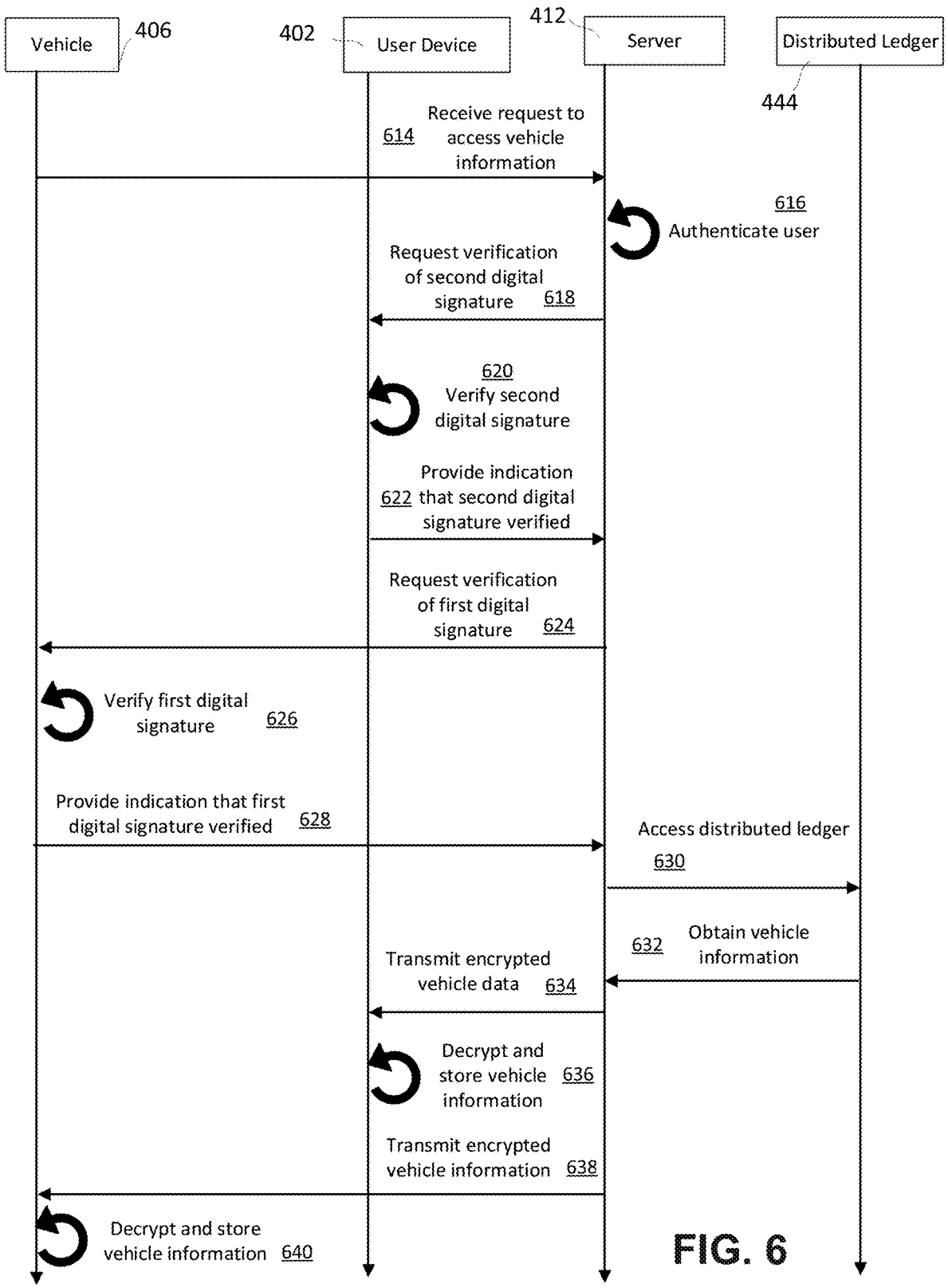

SYSTEMS AND METHODS FOR SECURELY MANAGING VEHICLE INFORMATION

INTRODUCTION

Some vehicles permit a user to access a user account storing certain data associated with the user or the user's vehicle. However, if an unauthorized user gains access to the user's login credentials, such unauthorized user is able to access the user's data and perform unauthorized actions. There is a need for a more secure technique for storing a user's vehicle information while still enabling the user to conveniently access his or her vehicle information.

SUMMARY

Accordingly, systems and methods are disclosed herein for generating, by a processor associated with a server, a first public-private key pair and a second public-private key pair, and generating, by the processor and based on the first public-private key pair and a vehicle identifier of a vehicle, a first digital signature associated with the vehicle. The provided systems and methods may be further configured to generate, by the processor and based on the second public-private key pair and a mobile application identifier of a mobile application associated with a mobile device operated by a user, a second digital signature associated with the mobile application, wherein the vehicle identifier and the mobile application identifier are associated with a user profile in a database maintained by the server. The processor may transmit the first digital signature and the public key of the first public-private key pair to the vehicle, and the first digital signature may be stored in a memory module associated with the vehicle. The processor may transmit the second digital signature and the public key of the second public-private key pair to the mobile application, and the mobile application may facilitate the storage of the second digital signature in a local memory of the mobile device. A request (e.g., associated with the user profile) to access the vehicle information may be determined to be received, and access to the vehicle information may be permitted based on the first digital signature and the second digital signature.

In some embodiments, permitting access to the vehicle information based on the first digital signature and the second digital signature comprises receiving, by the processor, a first indication that the vehicle has verified the vehicle identifier associated with the user profile, wherein the verification associated with the first indication is performed using the first digital signature, and receiving, by the processor, a second indication that the mobile application has verified the mobile application associated with the user profile, wherein the verification associated with the second indication is performed using the second digital signature. The processor may permit access to the vehicle information in response to receiving the first indication and the second indication.

In some embodiments, the provided systems and methods further comprise determining, by the processor, that a user associated with the user profile has selected an option to register for secure management of the vehicle information, and in response to determining that the user associated with the user profile has selected the option to register for secure management of the vehicle information, generating, by the processor, the first public-private key pair and the second public-private key pair. In some embodiments, the mobile application may be implemented at a key fob or a smart phone.

In some embodiments, the vehicle information is stored at a distributed ledger. At least one of the first public-private key pair and the second public-private key pair may be usable to execute a transaction associated with the vehicle information on the distributed ledger, and the distributed ledger may be updated based on the transaction. In some embodiments, the first digital signature may be associated with a non-fungible token stored at the distributed ledger, where the non-fungible token comprises historical ownership information of the vehicle and is transferable to a new vehicle owner.

In some embodiments, determining that the request to access the vehicle information has been received comprises receiving login credentials and determining whether the received login credentials match login credentials of the user profile.

In some embodiments, a system for securely managing vehicle information is provided, where the system comprises a server and processing circuitry. The server may be configured to generate a first public-private key pair and a second public-private key pair, and generate, based on the first public-private key pair and a vehicle identifier, a first digital signature associated with the vehicle. The server may generate, based on the second public-private key pair and a mobile application identifier of a mobile application associated with a mobile device operated by a user, a second digital signature associated with the mobile application, where the vehicle identifier and the mobile application identifier are associated with a user profile in a database maintained by the server, and transmit the first digital signature and the public key of the first public-private key pair to the vehicle, where the first digital signature may be stored in a memory module associated with vehicle. The processing circuitry may transmit the second digital signature and the public key of the second public-private key pair to the mobile application, wherein the mobile application facilitates storage of the second digital signature in a local memory of the mobile device. Processing circuitry may determine that a request to access the vehicle information has been received, wherein the request is associated with the user profile, and permit access to the vehicle information based on the first digital signature and the second digital signature.

In some embodiments, a non-transitory computer-readable medium having non-transitory computer-readable instructions encoded thereon may be provided that, when executed by a processor associated with a server, causes the processor to generate a first public-private key pair and a second public-private key pair, and generate, based on the first public-private key pair and a vehicle identifier, a first digital signature associated with the vehicle. The execution of the instructions may cause the processor to generate, based on the second public-private key pair and a mobile application identifier of a mobile application associated with a mobile device operated by a user, a second digital signature associated with the mobile application, where the vehicle identifier and the mobile application identifier are associated with a user profile in a database maintained by the server, and transmit the first digital signature and the public key of the first public-private key pair to the vehicle, where the first digital signature may be stored in a memory module associated with the vehicle. The execution of the instructions may cause the processor to transmit the second digital signature and the public key of the second public-private key pair to the mobile application, wherein the mobile application facilitates storage of the second digital signature in a local memory of the mobile device. The execution of the instructions may cause the processor to determine that a request to access the vehicle information has been received, wherein the request is associated with the user profile, and permit access to the vehicle information based on the first digital signature and the second digital signature.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 4B shows a block diagram of a system for permitting access to vehicle information based on digital signatures, in accordance with some embodiments of the present disclosure.

FIG. 5 shows a flowchart of an illustrative process for generating public-private key pairs and digital signatures, in accordance with some embodiments of the present disclosure.

FIG. 6 shows a flowchart of an illustrative process for securely authenticating a user and permitting access to vehicle information based on digital signatures, in accordance with some embodiments of the present disclosure.

DETAILED DESCRIPTION

Figure 1:
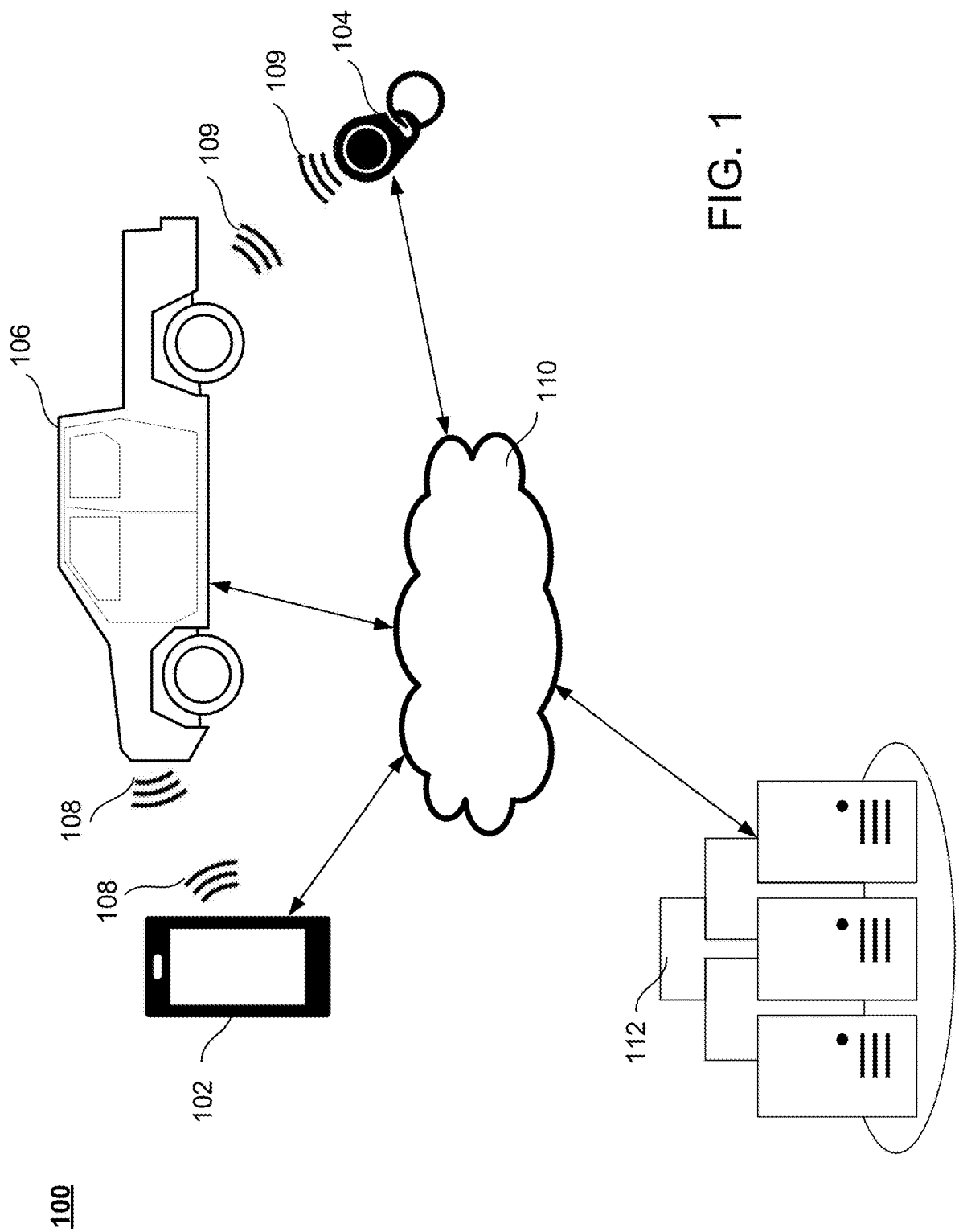
FIG. 1 shows a block diagram of a system for securely authenticating a user and permitting access to vehicle information based on digital signatures, in accordance with some embodiments of the present disclosure.

FIG. 1 shows a block diagram of system 100 for securely authenticating a user and permitting access to vehicle information based on digital signatures, in accordance with some embodiments of the present disclosure. System 100 may comprise vehicle 106, one or more of user device 102 (e.g., a mobile device, such as, for example, a smart phone or a tablet, or any other suitable computing device, such as, for example a laptop computer, a desktop computer, etc.) and user device 104 (e.g., a key fob) and cloud computing resources 112 (e.g., one or more remote servers, which may include and/or maintain and/or be in communication with one or more databases). Such elements of system 100 may be configured to communicate over any suitable wireless communication path. For example, user devices 102 and 104 may be configured to communicate with vehicle 106 over a short-range radio communication technique, such as, for example, Bluetooth low energy (BLE) 108 or near-field communication (NFC) 109, and user devices 102 and 104 and vehicle 106 may communicate with server 112 over network 110, e.g., the Internet, a local area network, a wide area network, a satellite network, a cellular network, etc.

System 100 may employ cryptographic techniques (e.g., any suitable algorithms for generation of public-private key pairs, generation of shared keys, generation of digital signatures, hashing algorithms, etc.). Such cryptographic techniques may be utilized in managing and verifying the identity of a user that requests vehicle information (e.g., related to user vehicle 106), based on securely stored cryptographic keys and digital signatures, and in permitting an authenticated user to access vehicle information, and/or permitting a transaction to be executed in connection with the vehicle information. In some embodiments, permitting access to the vehicle information may comprise generating for presentation, the vehicle information at any suitable device, e.g., via a mobile application executing at user device 102 or user device 104, via an application stored at least in part on a memory module of vehicle 106 and executing at vehicle. 106, etc. The user may be permitted to manage such vehicle information, e.g., permit or revoke access to the information for certain entities. In some embodiments, permitting access to the vehicle information may comprise enabling a transaction to be proceed to be processed along various payment platforms or payment networks (e.g., to enable purchase of a vehicle accessory or vehicle part, and track delivery and integrity of such accessory or part). In some embodiments, a user associated with a mobile application or accessing the vehicle information via a vehicle may be permitted to communicate such vehicle information to another party (e.g., an insurance company, a prospective vehicle buyer, the vehicle manufacturer, etc.) for use in a commercial transaction. For example, once a user is permitted to access his or her vehicle information, he or she may permit an insurance company to securely access the information in order to generate an insurance quote. The secure nature of the cryptographic techniques utilized herein may prevent hackers or bad actors from accessing vehicle information, e.g., stored at a distributed ledger.

In some embodiments, the vehicle information may be stored at a distributed ledger, and a user may access the distributed ledger from user device 102, user device 104, vehicle 106, or any other suitable computing device. In some embodiments, each node of system 100 may be configured to store the distributed ledger. In some embodiments, the user may be permitted to access the distributed ledger via server 112 after the identity of the user is authenticated and verified by system 100. In some embodiments, a user may be a driver or operators of vehicle 106, or any other suitable entity (e.g., an enterprise entity such as, for example, an insurance company, a vehicle manufacturer, etc.). In some embodiments, the vehicle information may comprise a driving history of vehicle 106, past and current ownership information of vehicle 106, user information, vehicle-related data, and/or any other suitable information. In some embodiments, the vehicle information may be stored in the form of a non-fungible token (NFT) on the distributed ledger, and may be transferable to one or more other parties. In some embodiments, the distributed ledger may store current traffic information or road condition information, for use by any suitable number of vehicles. For example, users may be rewarded by posting traffic information to the distributed ledger for consumption by other users associated with respective vehicles and having access to the distributed ledger. In some embodiments, the user may be permitted to access data stored at the distributed ledger related to the user's personal preferences, e.g., desired vehicle settings, preferred music options. In some embodiments, the distributed ledger may be utilized to facilitate ride-sharing, or vehicle sharing, applications. For example, a user may be permitted to access available rides via the ride-sharing platform when accessing the distributed ledger.

In some embodiments, server 112 may be utilized to associate one or more user accounts (e.g., each associated with login credentials comprising a particular user ID stored at server 112, which may be associated with a vehicle manufacturer or distributor) with vehicle 106 (e.g., associated with a particular vehicle identifier), associate one or more user profiles with a user account, and/or associate one or more user devices and/or a mobile application (associated with a particular mobile application identifier and a mobile device operated by a user) with a particular user account or profile. Server 112 may enable a user to log into a user account at vehicle 106, and in response to logging to the user account, retrieve (e.g., from server 112 or vehicle 106) the user profile associated with the user account, and cause the user profile to be loaded at vehicle 106. In some embodiments, user credentials may be generated and stored at server 112 and enable log-in for a particular user (e.g., by comparing received credentials to stored credentials associated with the user account).

In some embodiments, a user profile corresponds to or otherwise is associated with a user account of a vehicle manufacturer. Vehicle identifying information and user device information can be included in the user profile. In some embodiments, user device 102 or user device 104 may be configured to implement a mobile application (e.g., provided by and/or associated with the vehicle manufacturer) that allows the user to access the user profile and specify certain settings or preferences of the user profile and/or to obtain vehicle information.

In some embodiments, user device 102 and/or 104 may be operable by a user to perform various functions in connection with vehicle 106 (e.g., remote start, unlocking and locking doors or hatches, pairing to a media system of vehicle 106, starting or turning of vehicle 106, signaling a panic condition, etc.) over wireless or wired communication paths.

Figure 2:
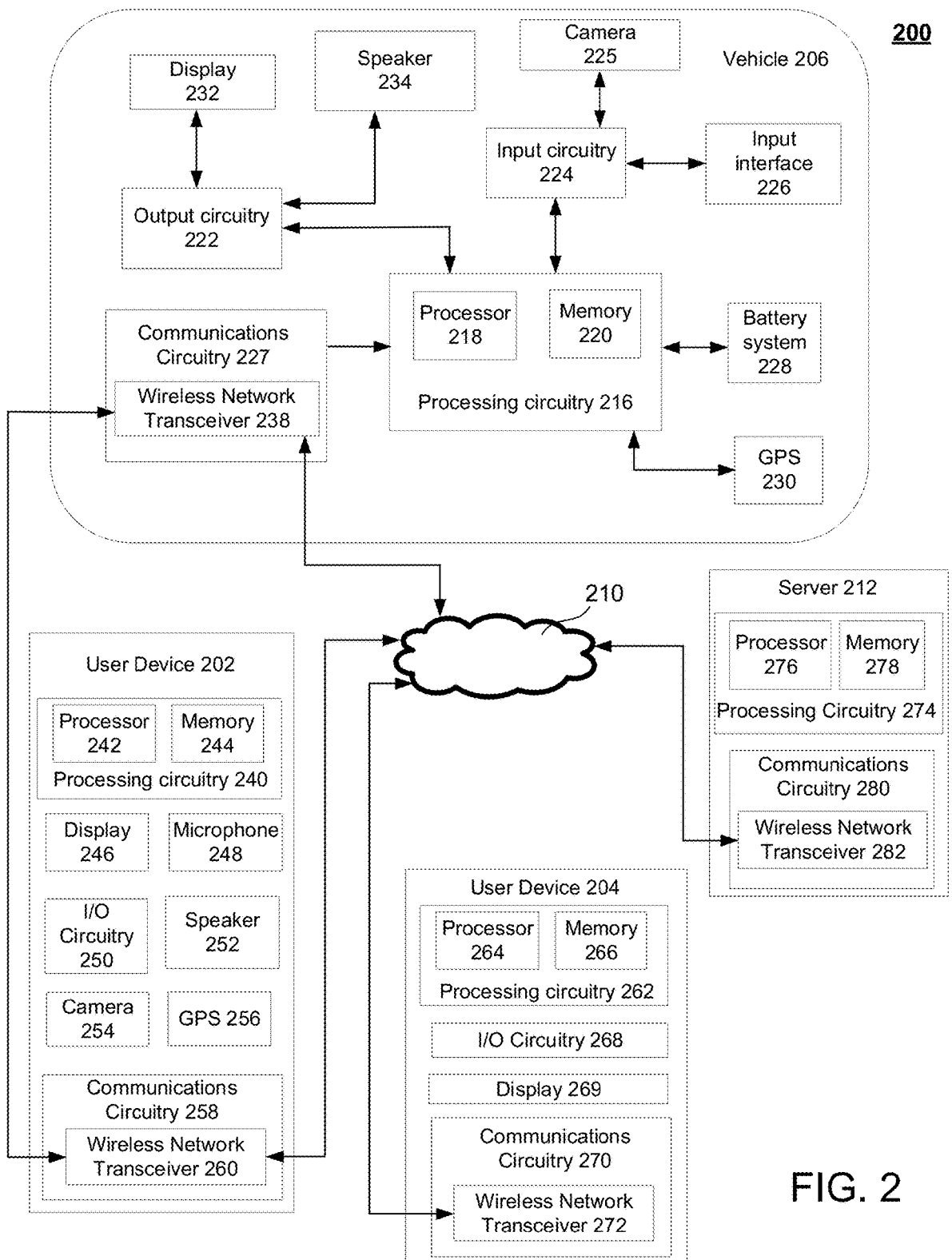
FIG. 2 shows a block diagram of a system for securely authenticating a user and permitting access to vehicle information based on digital signatures, in accordance with some embodiments of the present disclosure.

FIG. 2 shows a block diagram of system 200 for securely authenticating a user and permitting access to vehicle information based on digital signatures, in accordance with some embodiments of the present disclosure. System 200 comprises vehicle 206, which may correspond to vehicle 106 of FIG. 1, and user device 202, which may correspond to user device 102 (e.g., a mobile device, such as, for example, a smartphone) and/or user device 204 (e.g., such as, for example, a key fob). Vehicle 206 may be in communication with server 212, user device 202, and user device 204 over one or more networks 210, or any other suitable network (e.g., short-range wireless communication). In some embodiments, each element of system 200 may be configured to execute a vehicle application (e.g., provided by a manufacturer of vehicle 206) to perform the techniques described above and below, e.g., to manage and verify the identity of a user that requests vehicle information based on securely stored cryptographic keys and digital signatures, securely provide vehicle information to the user, and/or permit a transaction to be executed in connection with the vehicle information. Vehicle 206 may be a car (e.g., a coupe, a sedan, a truck, an SUV, a bus), a motorcycle, an aircraft (e.g., a drone), a watercraft (e.g., a boat), or any other type of vehicle. In some embodiments, vehicle 206 may be configured to operate autonomously or semi-autonomously.

Vehicle 206 may comprise processing circuitry 216 which may comprise processor 218 and memory 220. Processor 218 may comprise a hardware processor, a software processor (e.g., a processor emulated using a virtual machine), or any combination thereof. In some embodiments, processor 218 and memory 220 in combination may be referred to as processing circuitry 216 of vehicle 206. In some embodiments, processor 218 alone may be referred to as processing circuitry 216 of vehicle 206. Memory 220 may comprise hardware elements for non-transitory storage of commands or instructions, that, when executed by processor 218, cause processor 218 to operate vehicle 206 in accordance with embodiments described above and below. Processing circuitry 216 may be communicatively connected to components of vehicle 206 via one or more wires, or via wireless connection. Memory 220 may be a memory module configured to store a digital signature and/or a vehicle identifier and/or a public key of associated with vehicle 206.

Processing circuitry 216 may be communicatively connected to input interface 226 (e.g., a steering wheel, a touch screen display, buttons, knobs, a microphone or other audio capture device, etc.) via input circuitry 224. In some embodiments, a driver of vehicle 206 may be permitted to select certain settings in connection with the operation of vehicle 206 via input interface 226. Input interface 226 may be communicatively connected to one or more cameras 225, which may be configured to capture an internal or external environment of vehicle 206. Such images may be transmitted to processing circuitry 216 and used to, e.g., detect obstacles or vehicles in a vicinity of vehicle 206, for biometric (e.g., facial recognition or fingerprint identification) purposes to authenticate a driver of vehicle 206, etc. In some embodiments, vehicle 206 may comprise one or more sensors positioned at a variety of locations of vehicle 206, and such sensors may be one or more of a variety of types, e.g., an image sensor, an ultrasonic sensor, a radar sensor, LED sensor, LIDAR sensor, etc., configured to measure the distance between vehicle 206 and an object in a surrounding environment of the vehicle (e.g., by outputting a light or radio wave signal, and measuring a time or a return signal to be detected and/or an intensity of the returned signal, and/or performing image processing on images captured by the image sensor of the surrounding environment of vehicle 206).

Processing circuitry 216 may be communicatively connected to display 232 and speaker 234 by way of output circuitry 222. Display 232 may be located at a dashboard of vehicle 206 and/or at a heads-up display at a windshield of vehicle 206. Display 232 may comprise an LCD display, an OLED display, an LED display, or any other type of display. Display 232 may be configured to display selectable identifiers associated with user profiles of a particular user account associated with vehicle 206. Speaker 234 may be located at any location within the cabin of vehicle 206, e.g., at the dashboard of vehicle 206, on an interior portion of the vehicle door, etc., and may be configured to provide audio output to a driver and/or occupant of vehicle 206.

Processing circuitry 216 may be communicatively connected to communications circuitry 227. Communications circuitry 227 may comprise wireless network transceiver 238 which may comprise any suitable hardware and/or software operable to send and receive wireless signals between vehicle 206 and external devices such as, for example, network or user devices (e.g., user device 202, user device 204, server 212, and/or a Wi-Fi access point and/or a satellite) and/or any other suitable computing devices. Wireless network transceiver 238 may include an antenna and other control circuitry (e.g., protocol converters, rate converters, signal converters), or any combination thereof.

Wireless network transceiver 238 may comprise one or more components to facilitate communication over any suitable network or communication method (e.g., the Internet, short-range radio communication such as, for example, Bluetooth, BLE, NFC, etc.). For example, wireless network transceiver 238 may be configured to access the Internet, a local area network, a wide area network, a Bluetooth-enabled device, a NFC-enabled device, any other suitable device using any suitable protocol, or any combination thereof. In some embodiments, wireless network transceiver 238 may comprise a sensor configured to advertise a vehicle identifier (e.g., over a BLE link).

Processing circuitry 216 may be communicatively connected to battery system 228, which may be configured to provide power to one or more of the components of vehicle 206 during operation. In some embodiments, vehicle 206 may be an electric vehicle or a hybrid electric vehicle, and/or may be configured to be an autonomous or semi-autonomous vehicle. Processing circuitry 216 may be communicatively connected to GPS system 230 or other positioning device of vehicle 206, where the driver may interact with GPS system 230 via input interface 226. GPS system 230 may be in communication with (e.g., via communications circuitry 227) one or more satellites and/or servers remote from vehicle 206 to ascertain a location of vehicle 206 and provide navigation directions to processing circuitry 216. As another example, the positioning device may operate on terrestrial signals, such as cell phone signals, Wi-Fi signals, or ultra-wideband signals to determine a location of vehicle 206. The determined location may be in any suitable form such as a geographic coordinate, a street address, a nearby landmark such as an identification of the nearest charging station or a tagged location associated with vehicle 206 (e.g., a location of a home of the user stored in memory 220).

It should be appreciated that FIG. 2 only shows some of the components of vehicle 206, and it will be understood that vehicle 206 also includes other elements commonly found in vehicles (e.g., electric vehicles), e.g., a motor, brakes, wheels, wheel controls, turn signals, windows, doors, etc.

User device 202 may be, for example, a smartphone, tablet or any suitable personal computing device operable to communicate with vehicle 206, user device 204, and server 212, e.g., by way of wireless network transceiver 260. In some embodiments, user device 202 may be configured to communicate with vehicle 206 by way of a wired connection (e.g., USB connection or other data cable).

User device 202 may comprise processing circuitry 240, processor 242, memory 244, which may be implemented in a similar manner as processing circuitry 216, processor 218 and memory 220, respectively. User device 202 may further comprise display 246, microphone 248, input/output (I/O) circuitry 250, speaker 252, camera 254 and GPS 256, which may be implemented similarly to display 232, input interface 226, speaker 234, output circuitry 222 and input circuitry 224, speaker 234, camera 225 and GPS 230. Communications circuitry 258 may be implemented in a similar manner as communications circuitry 227 of vehicle 206. Communications circuitry 258 may comprise wireless network transceiver 260 which may comprise one or more components configured to receive and transmit signals using various communication techniques. For example, wireless network transceiver 260 may enable user device 202 to communicate with vehicle 206 over a first communication path (e.g., BLE, NFC or other short-range communication technique) and wireless network transceiver 260 may enable user device 202 to communicate with server 212 over a second communication path (e.g., network 210, such as, for example, the Internet, a satellite network, etc.). In some embodiments, a mobile application may be implemented at user device 202, and may facilitate storage of a digital signature and/or a public key associated with the mobile application and/or mobile application identifier in a local memory 244 of user device 202. For example, the mobile application may direct the storage of the digital signature and/or public key to local memory 244.

User device 204 may be, e.g., a key fob. User device 204 may comprise processing circuitry 262, processor 264, memory 266, I/O circuitry 268, communications circuitry 270 and wireless network transceiver 272. Key fob 204 may comprise one or more buttons or other features for receiving haptic input from a user. For example, in some embodiments, key fob 204 comprises a number of buttons (e.g., two, three, four, or more than four buttons) that respectively correspond to a function or command. Key fob 204 may include a battery to provide electrical power, an antenna for transmitting and receiving signals, and processing circuitry 262 may convert user selections (e.g., presses of a button) to an electrical signal which may then be converted to a wireless signal (e.g., via the antenna). Wireless network transceiver 272 may be configured to enable user device 204 to communicate with vehicle 206 over a first communication path (e.g., BLE, NFC or other short-range communication technique) and wireless network transceiver 272 may enable user device 202 to communicate with server 212 over a second communication path (e.g., network 210, such as, for example, the Internet, a satellite network, etc.). In some embodiments, a mobile application may be implemented at user device 204, and may facilitate storage of a digital signature and/or a public key associated with the mobile application and/or mobile application identifier in a local memory 266 of user device 202.

Server 212 may comprise a plurality of servers configured to remotely provide cloud computing resources (e.g., storage, processing, software applications, etc.) to other components of system 200, e.g., user device 202, user device 204 and/or vehicle 206. Server 212 may be configured to maintain one or more databases. In some embodiments, server 212 may be associated with a manufacturer of vehicle 206, and may be configured to store (e.g., a cloud-based storage system such as in memory 278 or a database associated with server 212) information related to each vehicle sold by the manufacturer and related to an owner of each vehicle, e.g., login credentials associated with a user account and/or user profile of the vehicle owner with the manufacturer, which may be generated for and provided to the user upon his or her purchase of vehicle 206; user permissions and roles or certain user accounts or user profiles; user preferences in connection with certain user accounts or profiles, etc. Such information may be stored in any suitable format such as, for example, a centralized database, a distributed ledger, a lookup table, a set of flags, one or more ASCII characters or words (e.g., in a text file), any other format, or any combination thereof.

Server 212 may comprise processing circuitry 274 comprising processor 276 and memory 278, communications circuitry 280 and wireless network transceiver 282. Processing circuitry 274 may be implemented in a similar manner as processing circuitry 216, except processing circuitry 274 may be configured to utilize processors providing a significant amount of computing power, and server 212 may be configured to comprise storage and memory 278 with a significant capacity. In some embodiments, server 212 may comprise a collection of servers, and processing circuitry 274 can be distributed across a number of servers.

Server 212 may be configured to generate a public-private key pair associated with vehicle 206 and a public-private key pair associated with user device 202, and may be configured to generate respective digital signatures to be sent to vehicle 206 and user device 202, for use in authenticating an identity of a user. In some embodiments, server 212 may be configured to store, e.g., in association with a particular user account or user profile, each public-private key pair, a vehicle identifier, a mobile application identifier, and the respective digital signatures. In some embodiments, user device 202 or 204 may be configured to store a public key and a digital signature received from server 212, and vehicle 206 may be configured to store a public key and a digital signature received from server 212.

Figure 3:
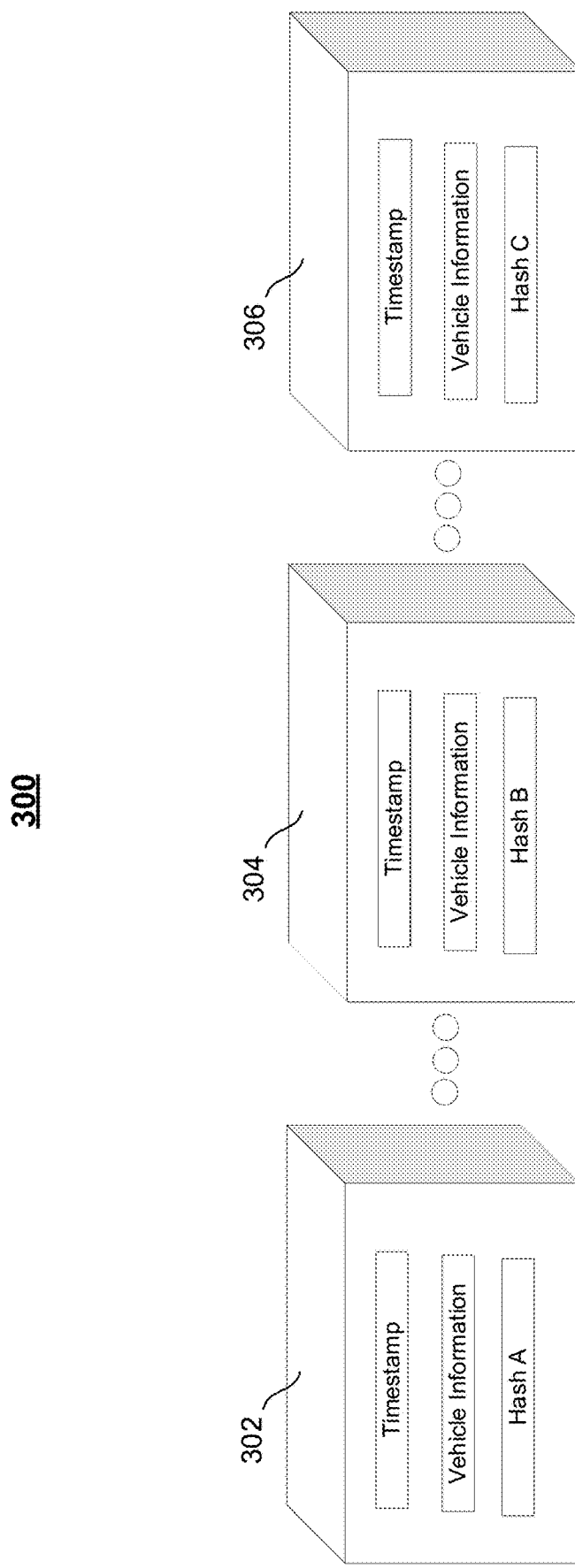
FIG. 3 shows a block diagram of a distributed ledger, in accordance with some embodiments of the present disclosure.

FIG. 3 shows a block diagram of a distributed ledger 300, in accordance with some embodiments of the present disclosure. In some embodiments, distributed ledger 300 may be a decentralized, shared database implemented as a blockchain distributed ledger in which multiple network-connected computing devices (e.g., vehicle 206, server 212, user device 202) may locally store, or otherwise be granted access to, distributed ledger 300. Distributed ledger 300 may comprise a plurality of blocks 302, 304, 306 each comprising data records related to respective transactions. Distributed ledger 300 may be updated via continuous or peer-to-peer communications between the nodes having access to distributed ledger 300. A user may be permitted to access vehicle information by way of distributed ledger 300.

Cryptographic techniques (e.g., hash functions, public-private key pairs) may be employed to ensure that the sequence of transactions on each copy of distributed ledger 300 matches. In some embodiments, one or more consensus mechanisms (e.g., proof of work, proof of stake, byzantine fault) may be employed in association with distributed ledger 300, in order to validate transactions on distributed ledger 300. Any suitable number of nodes may be required to validate transactions for recordation of distributed ledger 300 (e.g., each node in the network, a majority of nodes in the network, specific nodes in the network, etc.). In some embodiments, distributed ledger 300 may be permissionless or public (e.g., any node can access distributed ledger 300 and submit transactions or perform validation) or distributed ledger 300 may be permissioned or private (e.g., server 212 may invite only certain identified or authenticated nodes to interact with distributed ledger 300). A private blockchain may be more centralized and restricted, and less based on consensus, as compared to a public blockchain.

Each of block 302, 304, 306 may comprise data (e.g., vehicle information related to a particular vehicle) associated with a transaction, a timestamp associated with the transaction, and a computed hash value associated with the transaction (e.g., computed by inputting the vehicle information into a hash function). While only three blocks are shown, one of ordinary skill in the art would appreciate that any number of blocks may be stored at distributed ledger 300. In some embodiments, hash functions (e.g., SHA-1, SHA-2, SHA-256) and timestamps may be employed to validate transactions on distributed ledger 300 and ensure the integrity of the blockchain. Each block 302, 304, 306 may be chained to the other blocks, in that each new block may comprise a concatenation of hashes of the previous blocks representing the previous transactions. For example, the value of Hash B of block 304 may depend at least in part on Hash A of block 302, and the value of Hash C of block 306 may depend at least in part on Hash B of block 304. Such features of distributed ledger 300 facilitate the immutable nature of distributed ledger 300, e.g., if data in a block is tampered with, other nodes would not be able to recompute hashes to verify that all hashes in the blockchain are correct.

In some embodiments, public-private key pairs may be utilized to verify data being submitted to distributed ledger 300 by a user having a particular private key, such that data (e.g., a hash of the data) encrypted by the private key can be decrypted with the public key of the public-private key pair, and a digital signature may be generated using the public-private key pair. Other nodes on distributed ledger 300 may perform computations to verify the signer. In some embodiments, the public key may correspond to an address at which data can be transmitted on distributed ledger 300. Timestamps may be employed to distinguish transactions on distributed ledger 300. In some embodiments, vehicle information may be stored on a centralized database, alternatively or in addition to being stored at distributed ledger 300.

In some embodiments, NFTs and/or smart contracts (e.g., for automatic execution if a condition specified in the smart contract occurs) may be stored at distributed ledger 300 for execution. For example, an NFT may comprise immutable tokens indicating each prior owner (e.g., a particular vehicle had 3 prior owners; a celebrity previously owned this vehicle, etc.). In some embodiments, a smart contract may be utilized in conjunction with an NFT, e.g., to automatically provide value to a party when a transaction occurs with respect to a vehicle specified in the NFT. In some embodiments, a smart contract may be utilized in enabling a user to perform a transaction related to charging his or her electric vehicle, e.g., paying to charge his or her vehicle at an electric charging station.

Figure 4A:
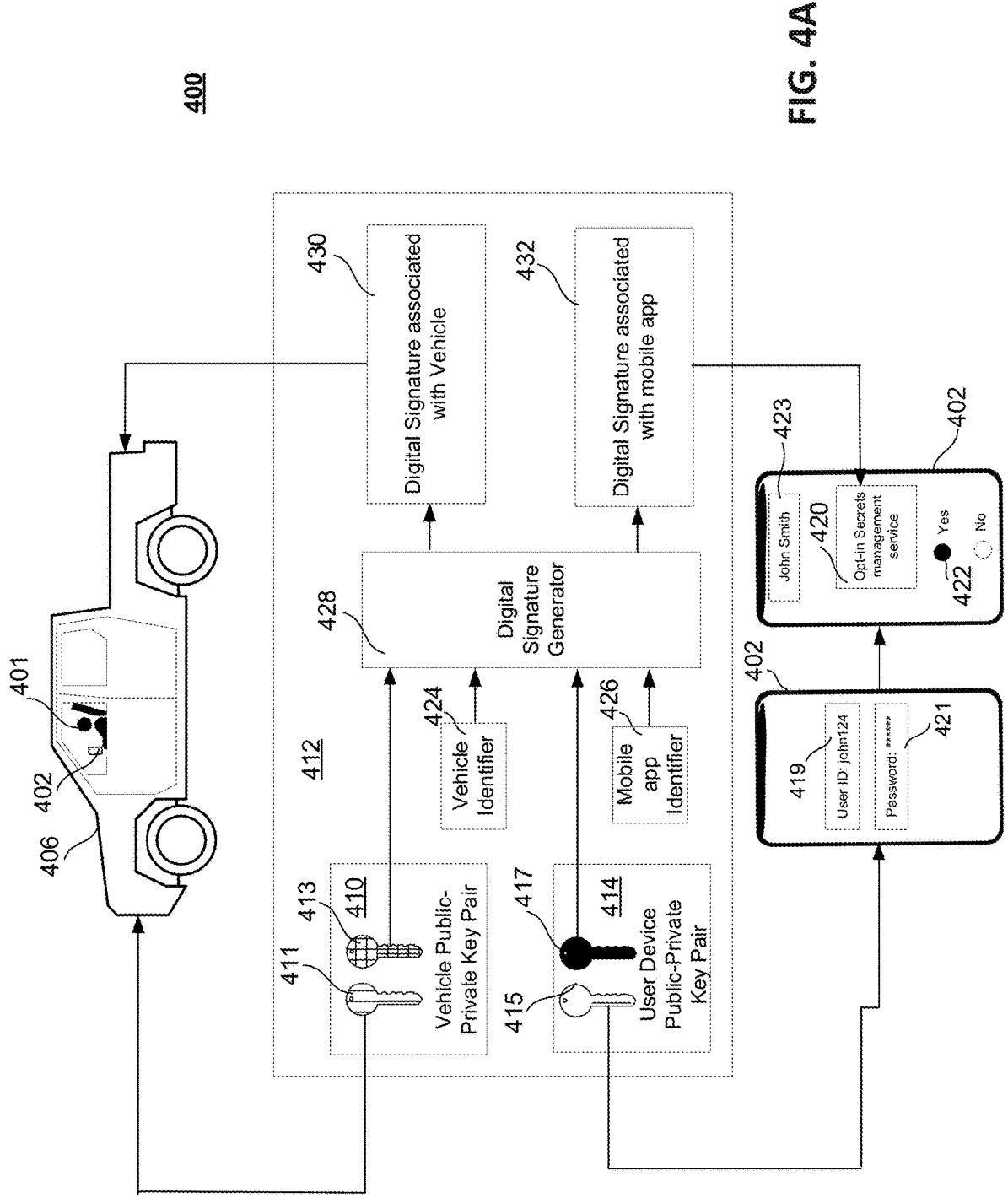
FIG. 4A shows a block diagram of system 400 for generating public-private key pairs and digital signatures, in accordance with some embodiments of the present disclosure.

FIG. 4A shows a block diagram of system 400 for generating public-private key pairs and digital signatures, in accordance with some embodiments of the present disclosure. System 400 depicts user 401 inside vehicle 406, where user 401 may be associated with user device 402, and vehicle 406 and user device 402 may be in communication with server 412 (e.g., over network 210).

Processing circuitry 274 of server 212 (which may correspond to server 412) may generate public-private key pair 410 comprising public key 411 and private key 413 and public-private key pair 414 comprising public key 415 and private key 417. Each public-private key pair may be generated using any suitable cryptographic algorithm or technique (e.g., RSA, ECC asymmetric algorithms, etc.). Public-private key pair 410 may be associated with vehicle 406 (which may correspond to vehicle 206), and public-private key pair 414 may be associated with a mobile application, e.g., provided by a manufacturer of vehicle 406, and being executed at least in part on mobile device 402 by processing circuitry 240 of user device 202 or processing circuitry 262 of user device 204 (either of which may correspond to user device 402). In some embodiments, each public key and private key may comprise respective strings of numeric characters or alphanumeric characters. In some embodiments, a message that is encrypted with one of public key 411 or private key 413 can only be decrypted with the other of public key 411 or private key 413, and a message that is encrypted with public key 415 or private key 417 can only be decrypted with the other of public key 415 or private key 417.

In some embodiments, the generation of public-private key pairs 410 and 414 may be performed in response to receiving a registration or sign-in request from user 401 (e.g., an owner of vehicle 406). For example, processing circuitry 240 of user device 202 (or processing circuitry of 216 of vehicle 206 or processing circuitry of any suitable computing device being operated by user 401) may receive input of login credentials including user ID 419 and password 421, which may be input by user 401 by way of I/O circuitry 250 or via input interface 226 of vehicle 406 (e.g., input via text entry, biometric identification, etc.). In some embodiments, a manufacturer of vehicle 406 may provide instructions, e.g., by server 212, via transmitting a message to an email address of user 401, to enable user 401 to create a user account associated with login credentials 419, 421. In some embodiments, user ID 419 of the user account or profile may correspond to a unique identifier comprising a string of alphanumeric characters, or a user name corresponding to a unique identifier comprising a name of the user.

In some embodiments, server 412, upon receiving the login credentials 419, 421 from wireless network transceiver 260 of user device 402 (e.g., over network 210), may determine whether the login credentials 419, 421 associated with user 401 are associated with an authenticated user account or user profile indicated at 423. For example, processing circuitry 274 of server 212 may compare the received login credentials 419, 421 to stored credentials stored in memory 278 of server 212 or other cloud storage, and determine based on the comparison whether the credentials match a stored entry for a particular user account or user profile indicated at 423. In some embodiments, user device 402, or vehicle 406, may determine whether the login credentials 419, 421 associated with user 401 are associated with the authenticated user account or user profile indicated at 423.

In some embodiments, generation of public-private key pairs 410 and 414 may be performed in response to receiving, from user 401, an affirmative selection 422 associated with indication 420 to opt-in to a secrets management service provided by one or more elements of system 400. For example, a user interface comprising indication 420 and affirmative selection 422 may be presented at user device 402 or vehicle 406 in response to user 401 being authenticated at server 212. Such user interface may be generated for presentation in response to server 212 determining that the user profile associated with the validated login credentials is authenticated. In some embodiments, the first time user 401 logs into his or her account, he or she may be automatically registered for the secrets management service.

In some embodiments, server 412 may generate or otherwise receive vehicle identifier 424 (e.g., a UUID comprising a string of alphanumeric characters) associated with vehicle 406, and mobile application identifier 426 (e.g., a UUID comprising a string of alphanumeric characters) associated with the mobile application running on user device 402. In some embodiments, one or more of vehicle identifier 424 and mobile application identifier 426 may be generated during manufacturing of vehicle 406 and/or assigned to a vehicle and the user account or user profile indicated at 423 of a vehicle owner upon purchase of vehicle 406 or registration with the secrets management service indicated at 420.

Server 412 may be configured to generate digital signature 430 associated with vehicle 406 and digital signature 432 associated with the mobile application (e.g., provided by a manufacturer of vehicle 406). For example, digital signature generator 428 may be employed to generate digital signature 430 using vehicle identifier 424 and private key 413 associated with vehicle 406, and digital signature generator 428 may be employed to generate digital signature 432 using private key 417 associated with vehicle 406 and mobile application identifier 426. Digital signature generator 428 may correspond to any suitable digital signature cryptographic algorithm or technique (e.g., DSA, ECDSA, EdDSA, RSA, Schnorr-based protocol). Server 412 may transmit public key 411 and digital signature 430 to vehicle 406, and public key 411 and digital signature 430 may be stored at a memory module of vehicle 406. Server 412 may transmit public key 415 and digital signature 432 to user device 402, at any suitable time. The mobile application executing at user device 402 may be configured to facilitate storage of public key 415 and digital signature 432 at user device 402.

In some embodiments, in generating digital signature 430, a cryptographic hash function (e.g., SHA-256, SHA-512, MD5, SHA-1) may be employed by digital signature generator 428 to generate a hash of vehicle identifier 424, for use in performing an authentication sequence associated with user 401, as between vehicle 406 and server 412. The cryptographic hash function may be understood as a function that accepts an arbitrary length string and outputs a hash or fingerprint of a fixed length string of characters (e.g., numeric or alphanumeric) and which is deterministic, e.g., the same output is yielded for the same repeated input. The obtained hash of vehicle identifier 424 may be combined with (e.g., encrypted by) private key 413 to generate digital signature 430, and digital signature 430 may be transmitted to vehicle 406 (e.g., separate from, or along with, public key 411). To generate digital signature 432, a hash of mobile application identifier 426 may be obtained and combined with (e.g., encrypted by) private key 417, and digital signature 432 may be transmitted to the mobile application (e.g., separate from, or along with, public key 415). In some embodiments, neither of private key 413 nor private key 417 is transmitted from server 412 to any other device, and instead is stored and kept secret at server 412.

FIG. 4B shows a block diagram of system 400 for permitting access to vehicle information based on digital signatures, in accordance with some embodiments of the present disclosure. Server 412 may receive a request from a user associated with the user account or user profile indicated at 423 to access vehicle information associated with vehicle 406. In some embodiments, such vehicle information may be stored at server 412 and/or distributed ledger 444 (which may correspond to distributed ledger 300) comprising blocks 458, 460, 462 (which may correspond to blocks 302, 304, 306). Such request to access vehicle information may be received from, e.g., user device 402 or vehicle 406, such as based on receiving selection of option 433. Since the user account or user profile indicated at 423 previously signed up for the secrets management service associated with indicator 420, server 412 may (at 446 and 448) request the mobile application, e.g., running on user device 402, and vehicle 406 to verify respective digital signatures 430 and 432 against the user account or user profile indicated at 423. For example, the request associated with 446 may comprise an indication of vehicle identifier 424 associated with the account or profile indicated at 423, and the request associated with 446 may comprise an indication of mobile application identifier 426 associated with the account or profile indicated at 423. In some embodiments, selection of option 433 may correspond to a request to access a most recent vehicle information transaction on distributed ledger 444.

In determining whether to provide the requested vehicle information to user 401, server 412 may wait for indications (at 450 and 452) that each of digital signature 430 and 432 has been verified by vehicle 406 and user device 402, respectively. The entity receiving the message (e.g., user device 402 or vehicle 406) may perform an authentication or verifying function on the received message, to authenticate user 401 associated with the user profile requesting vehicle information and ensure integrity of the message (e.g., comprising vehicle identifier 424 or mobile app identifier 426). For example, vehicle 406 may locally compute a hash of vehicle identifier 424, using a cryptographic hash function (e.g., the same hash function used by server 412 during the generation of digital signature 430), and decrypt previously received digital signature 430 using the previously received public key 411, to extract a hash associated with previously received digital signature 430. Vehicle 406 may determine whether the computed hash matches the hash extracted from digital signature 430; if there is a match, vehicle 406 may provide an indication (at 452) to server 412 indicating digital signature 430 has been verified. On the other hand, if such hash values do not match, access to the requested vehicle information may be denied, since the mismatch suggests that private key 413 stored at server 412 and used to generate digital signature 430 (stored at server 412 and vehicle 406) does not correspond to the public key stored in a memory module associated with vehicle 406.

Similarly, the mobile application running at user device 402 may locally compute a hash of mobile device identifier 426, using a cryptographic hash function (e.g., the same hash function used by server 412 during the generation of digital signature 432), and decrypt previously received digital signature 432 using the previously received public key 415, to extract a hash associated with previously received digital signature 432. The mobile application may determine whether the computed hash matches the hash extracted from digital signature 432; if there is a match, vehicle 406 may provide an indication (at 450) to server 412 indicating digital signature 432 has been verified. On the other hand, if such hash values do not match, access to the requested vehicle information may be denied, since the mismatch suggests that private key 417 stored at server 412 and used to generate digital signature 432 (stored at server 412 and in connection with the mobile application) does not match public key 415 stored at a local memory of user device 402, e.g., where the mobile application can facilitate such storage. Accordingly, even if an unauthorized third party were to obtain login credentials of user 401, if the third party attempted to access the account of user 401 via a mobile application implemented on a user device of the unauthorized third party, such access may be prevented. For example, if the mobile application identifier associated with the mobile application implemented on a user device of the unauthorized third party does not match the mobile application identifier associated with the instance of the mobile application of user device 402 of user 401, indication 450 may not be transmitted to server 450 due to a mismatch of the digital signature associated with the mobile application identifier stored in the user profile of user 401 and a digital signature locally computed by the mobile application of the unauthorized third party.

In some embodiments, prior to requesting (at 448) verification of digital signature 430 and/or prior to requesting (at 450) verification of digital signature 432, or as part of one or more of such verifications, user 401 may be prompted to confirm the request for vehicle information indicated at 433. For example, user device 402 (e.g., corresponding to a user device ID stored in connection with a user profile of user 401) and/or vehicle 406 (e.g., via display 232) may prompt user 401 to confirm the request for vehicle information, indicated at 433, as an additional layer of security. In some embodiments, the mobile application implemented at user device 402 and/or vehicle 406 may refrain from performing verifications of the respective digital signatures until a response to such one or more prompts is received. In some embodiments, one or more of such prompts may be transmitted via an electronic message, e.g., a text message or e-mail account associated with the user profile, for user confirmation. In some embodiments, if user device 402 is determined to be within a predefined vicinity of vehicle 406 and/or user device 204 (e.g., based on a strength of a signal or RSSI exchanged between user device 402 and vehicle 406 and/or user device 204), user 401 may not be prompted to confirm the request for vehicle information. As another example, if user 401 is determined to be located in vehicle 406, and vehicle 406 is determined to be on, vehicle 406 may prompt the user on display 422 to confirm that he or she is requesting vehicle information. In some embodiments, access to vehicle information may be provided only if user device 402 at which the mobile application is implemented is determined to be within a threshold distance from vehicle 406.

At 454, in response to receiving indications 450 and 452 (and optionally having previously authenticated user 401 based on the received login credentials 419 and 421), server 412 may retrieve vehicle information 456 requested by user 401 from distributed ledger 444 (or any other suitable database). For example, an indication of vehicle identifier 424 and/or mobile application identifier 426 may be stored at distributed ledger 444 in connection with vehicle information, and server 414 may retrieve the vehicle information associated with vehicle 406 requested at 433. In some embodiments, the vehicle information may be stored at distributed ledger 444 in any suitable format (e.g., JSON format) and may be encrypted using any suitable protocol. In some embodiments, the retrieved vehicle information 456 may be stored at server 412 and/or transmitted to vehicle 406 and/or user device 402 (e.g., the requesting device). In some embodiments, data access can be refreshed or revoked based on policies of a specific use case. In some embodiments, data may not be returned to vehicle 406 or user device 402, and may instead be returned to server 412 only.

In some embodiments, digital signature 430 and digital signature 432 (and public-private key pairs 410, 414) may be generated using the Edwards-curve Digital Signature Algorithm (EdDSA) protocol, and more specifically the Ed25519 protocol. EdDSA leverages the unique characteristics of elliptical curves, and more specifically the difficulty of solving an elliptic curve discrete logarithm problem. To generate digital signature 430 and digital signature 432 (and public-private key pairs 410, 414), the Ed25519 protocol utilizes various parameter values of an elliptic curve. Such parameters, and a type of elliptic curve being employed, may be established between server 412, vehicle 406, and the mobile application associated with mobile application identifier 426. Server 412 may generate private key 413 (e.g., 256 bits) and compute a point on the elliptic curve based on private key 413 and a parameter value G, a generator point or base point of the elliptic curve. Such computed point on the elliptic curve may correspond to public key 411 (e.g., 68 characters and 256 bits) of public-private key pairs 410, e.g., server 412 may compute point V on the elliptic curve of ($X_V$, $Y_V$), and transmit point V to vehicle 406, and server 412 may compute point M on the elliptic curve of ($X_M$, $Y_M$), and transmit point M to user device 302.

In the Ed25519 protocol, digital signature generator 428 may generate digital signature 430 (e.g., 512 bits) by computing a hash of private key 413 using a cryptographic hash function, and the computed hash of private key 413 may be hashed with vehicle identifier 424 to generate a deterministic nonce value $r_v$. A value $R_v$, corresponding to a point on the elliptical curve, may be computed based on nonce value $r_v$ and generator point G, and another value, $S_v$, may be generated based on nonce value $r_v$, private key 413 (or a hash thereof), and a hash of $R_v$, public key 413, and vehicle identifier 424. Based on such computations, digital signature 430 may be generated, and transmitted to vehicle 406 as, e.g., ($R_v$, $S_v$).

Similarly, in the Ed25519 protocol, digital signature generator 428 may generate digital signature 432 by computing a hash of private key 417 using a cryptographic hash function, and the computed hash of private key 417 may be hashed with mobile application identifier 426 to generate a deterministic nonce value $r_m$. A value $R_m$, corresponding to a point on the elliptical curve, may be computed based on nonce value $r_m$ and generator point G, and another value, $S_m$, may be generated based on nonce value $r_m$, private key 417 (or a hash thereof), and a hash of $R_m$, public key 415, and mobile application identifier 426. Based on such computations, digital signature 432 may be generated, and transmitted to user device 402 as, ($R_m$, $S_m$). In some embodiments, vehicle 406 may be configured to store public key 411 and digital signature 430 locally, and the mobile application associated with user device 402 may be configured to store public key 415 and digital signature 432 locally.

In the context of the Ed25519 protocol, in response to receiving request 446, vehicle 406 may verify digital signature 430 by determining whether generator point $G*S_v$ is equal to $R_v$+(public key 411)*(the hash of $R_v$, public key 411 and vehicle identifier 424). Vehicle 406 may have previously received digital signature 430 in the form of ($R_v$, $S_v$), previously received public key 411, may have previously stored vehicle identifier 424, may have access to the established elliptic curve parameters including generator point G, and may utilize such values to perform the above verification. The verification may utilize the same cryptographic hash function used by server 412 in generating digital signature 430.

Similarly, in the context of the Ed25519 protocol, in response to receiving request 446, the mobile application may verify digital signature 432 by determining whether generator point $G*S_m$ is equal to $R_m$+(public key 415)*(the hash of $R_m$, public key 415 and vehicle identifier 424). The mobile application may have previously received digital signature 432 in the form of ($R_m$, $S_m$) and previously received public key 415, may have previously stored mobile app identifier 426 and/or received mobile app identifier 426 at 448, may have access to the established elliptic curve parameters including generator point G, and may utilize such values to perform the above verification. The verification may utilize the same cryptographic hash function used by server 412 in generating digital signature 432. Processing may proceed to 454 in response to verifying each of digital signature 430 and digital signature 432.

Illustrative program code for generating public-private key pairs 410, 414 is provided below:

import ed25519
privKey, pubKey=ed25519.create_keypair( )
print("Private key (32 bytes):", privKey.to_ascii (encoding='hex'))
print("Public key (32 bytes):", pubKey.to_ascii (encoding='hex'))

In some embodiments, public keys 411 and 415, respectively received by vehicle 406 and the mobile application executed at user device 402, may be stored in a local security environment, such as in connection with a Near-field communication (NFC) environment, of each of vehicle 406 and user device 402. In some embodiments, public keys 411 and 415 may be respectively transmitted to vehicle 406 and user device 402 using an https secure connection, over network 210.

In some embodiments, a two way verification process may be utilized to facilitate encrypted transactions between user device 402 and vehicle 406, e.g., if network connectivity with server 412 is an issue. For example, short-range wireless communication techniques may be utilized to share data between user device 402 and vehicle 406. In some embodiments, if only local data access is available, one or more of vehicle 406 and user device 402 may access local data for basic functionality.

FIG. 5 shows a flowchart of illustrative process 500 for generating public-private key pairs and digital signatures, in accordance with some embodiments of the present disclosure. Process 500 may be executed at least in part by processing circuitry 274 of server 212, and/or processing circuitry 240 of user device 202 and/or processing circuitry 216 of vehicle 206.

At 514, processing circuitry 274 of server 212 may receive login credentials 419, 421 and/or request 420 to initiate registration of user 401 for a secrets management service, e.g., provided by a manufacturer of vehicle 406. Such credentials and/or request may be received from, e.g., user device 402 or vehicle 406.

At 516, processing circuitry 274 of server 212 may authenticate user 401. For example, processing circuitry 274 may compare the received login credentials associated with 401 to login credentials stored in memory 278, and in response to determining the received credentials match credentials of a particular user profile or user account, processing circuitry 274 may authenticate user 401. In some embodiments, a mobile application identifier 426 and a vehicle identifier 424 may be associated with the authenticated user profile and retrieved from memory 278 by processing circuitry 274, and a particular timestamp associated with the login may be generated. In some embodiments, the vehicle identifier and the mobile application identifier may be associated with the particular user profile in a database maintained by server 412.

At 518, after authenticating the user profile or user account of user 401 and/or receiving request 402, processing circuitry 274 of server 212 may employ cryptographic techniques to generate digital public-private key pair 410 associated with vehicle 406 and digital public-private key pair 414 associated with user device 402. In some embodiments, a particular timestamp may be generated and associated with the creation of each respective public-private key pair.

At 520, processing circuitry 274 of server 212 may generate digital signature 430 associated with vehicle 406. For example, processing circuitry 274 may implement digital signature generator 428 to generate digital signature 430 using vehicle identifier 424 and private key 413 associated with vehicle 406. In some embodiments, in generating digital signature 430, a cryptographic hash function may be utilized to generate a hash of vehicle identifier 424, and such hash of vehicle identifier 424 may be combined with (e.g., encrypted by) private key 413 to generate digital signature 430. In some embodiments, a particular timestamp may be generated and associated with the digital signature 430. In some embodiments, an EdDSA protocol (e.g., the Ed25519 protocol) may be employed to generate digital signature 430.

At 522, processing circuitry 274 of server 212 may generate digital signature 432 associated with user device 402. For example, processing circuitry 274 may implement digital signature generator 428 to generate digital signature 432 using mobile application identifier 426 and private key 417 associated with user device 402. In some embodiments, in generating digital signature 432, a cryptographic hash function may be utilized to generate a hash of mobile application identifier 426, and such hash of mobile application identifier 426 may be combined with (e.g., encrypted by) private key 417 to generate digital signature 430. In some embodiments, a particular timestamp may be generated and associated with the digital signature 432. In some embodiments, an EdDSA protocol (e.g., the Ed25519 protocol) may be employed to generate digital signature 432.

At 524, processing circuitry 274 of server 212 may cause communications circuitry 280 to transmit digital signature 430 and public key 411 to vehicle 406 over network 210. In some embodiments, communications circuitry 280 may transmit vehicle identifier 424 to vehicle 406. In some embodiments, vehicle 406 may have previously received vehicle identifier 424, or may be stored and/or embedded in processing circuitry 216 during manufacturing of vehicle 406. At 526, digital signature 430 and public key 411 may be stored at memory module 220 of vehicle 206.

At 528, processing circuitry 274 of server 212 may cause communications circuitry 280 to transmit digital signature 432 and public key 415 to user device 402 over network 210. In some embodiments, communications circuitry 280 may transmit mobile application identifier 426 to user device 402. In some embodiments, user device 402 may have previously received mobile application identifier 426, or the mobile application implemented at user device 402 may store mobile application identifier 426, e.g., assigned once user 401 creates a user account with the mobile application. At 530, the mobile application executing on user device 402 may facilitate the storage of digital signature 432 and public key 415 in a local memory 244 of user device 402.

FIG. 6 shows a flowchart of an illustrative process for securely authenticating a user and permitting access to vehicle information based on digital signatures, in accordance with some embodiments of the present disclosure. Process 600 may be executed at least in part by processing circuitry 274 of server 212, and/or processing circuitry 240 of user device 202 and/or processing circuitry 216 of vehicle 206.

At 614, processing circuitry 274 of server 212 may receive a request to access vehicle information. In some embodiments, the request may be received when user 401 selects option 433, and the vehicle information may be stored at distributed ledger 444. User 401 may already be logged in and authenticated, or may be prompted to enter his or her credentials for authentication at 616. In some embodiments, user details may be retrieved or fetched from memory 278 by processing circuitry 274 of server 212 for the authenticated user, e.g., user ID, user device ID, vehicle ID, public-private key pairs, mobile application ID, etc. In some embodiments, since user 401 has previously signed up for the secrets management service, server 212 may validate the identity of user 401 on each of server 212, vehicle 206 and the mobile application implemented at user 402.

At 618, processing circuitry 274 of server 212 may cause communications circuitry 280 to transmit a request to user device 402 to verify digital signature 432 associated with the user account of user 401. At 620, the mobile application implemented at user device 402 may perform a verification process in connection with digital signature 432. For example, to verify the identity of user 401, the mobile application may locally compute a hash of mobile application identifier 426, and extract a hash of digital signature 432 (e.g., by using the previously received public key 415 to decrypt digital signature 432), and compare the locally computed hash to the hash extracted from digital signature 432 to verify the identity of user 401. At 622, the mobile application may provide an indication to server 412 that digital signature 432 has been verified.

At 624, processing circuitry 274 of server 212 may cause communications circuitry 280 to transmit a request to vehicle 406 to verify digital signature 430 associated with the user account of user 401. At 626, software implemented at vehicle 406 may perform a verification process in connection with digital signature 430. For example, to verify the identity of user 401, vehicle 406 may locally compute a hash of vehicle identifier 424, and extract a hash of digital signature 430 (e.g., by using the previously received public key 411 to decrypt digital signature 430), and compare the locally computed hash to the hash extracted from digital signature 430 to verify the identity of user 401. At 628, the mobile application may provide an indication to server 412 that digital signature 432 has been verified. In some embodiments, prior to performing the verifications at 620 and 626 and/or providing the indications at 622 and 628, vehicle 406 and/or user device 402 may prompt user 401 to confirm that he or she has requested the vehicle information, as an additional layer of security.

At 630, in response to determining that user 401 has been validated at each of server 412, vehicle 406, and the mobile application implemented at user device 402 or user device 404, server 412 may access vehicle information stored at distrusted ledger 444. In some embodiments, server 412 may locally store a copy of distributed ledger 444, which may be a public or private decentralized database in which any suitable number of nodes participate. In some embodiments, the vehicle information may be stored in JSON format or any other suitable format, and may correspond to a most recent transaction associated with vehicle 406. In some embodiments, distributed ledger 444 may store smart contracts and/or NFTs.

At 632, server 412 may obtain the vehicle information (e.g., requested by user 401 at 614), which may be encrypted using any suitable technique. In some embodiments, the requested vehicle information may be returned to the requesting device, e.g., vehicle 406, such as at 638, and/or user device 402, such as at 634. At 636, user device 402 may decrypt and securely store the received vehicle information for any suitable period of time. At 640, vehicle 406 may decrypt and securely store the received vehicle information for any suitable period of time.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method for securely managing vehicle information, the method comprising:

generating, by a processor associated with a server, a first public-private key pair and a second public-private key pair;

generating, by the processor and based on the first public-private key pair and a vehicle identifier of a vehicle, a first digital signature associated with the vehicle;

generating, by the processor and based on the second public-private key pair and a mobile application identifier of a mobile application associated with a mobile device operated by a user, a second digital signature associated with the mobile application, wherein the vehicle identifier and the mobile application identifier are associated with a user profile in a database maintained by the server;

transmitting, by the processor, the first digital signature and the public key of the first public-private key pair to the vehicle, wherein the first digital signature is stored in a memory module associated with the vehicle;

transmitting, by the processor, the second digital signature and the public key of the second public-private key pair to the mobile application, wherein the mobile application facilitates storage of the second digital signature in a local memory of the mobile device;

determining that a request to access the vehicle information has been received, wherein the request is associated with the user profile; and permitting access to the vehicle information based on the first digital signature and the second digital signature.

2. The method of claim 1, wherein:

permitting access to the vehicle information based on the first digital signature and the second digital signature comprises:

receiving, by the processor, a first indication that the vehicle has verified the vehicle identifier associated with the user profile, wherein the verification associated with the first indication is performed using the first digital signature;

receiving, by the processor, a second indication that the mobile application has verified the mobile application associated with the user profile, wherein the verification associated with the second indication is performed using the second digital signature; and permitting, by the processor, access to the vehicle information in response to receiving the first indication and the second indication.

3. The method of claim 1, further comprising:

determining, by the processor, that the user associated with the user profile has selected an option to register for secure management of the vehicle information; and in response to determining that the user associated with the user profile has selected the option to register for secure management of the vehicle information, generating by the processor, the first public-private key pair and the second public-private key pair.

4. The method of claim 1, wherein the vehicle information is stored at a distributed ledger.

5. The method of claim 4, wherein at least one of the first public-private key pair and the second public-private key pair is usable to execute a transaction associated with the vehicle information on the distributed ledger, and the distributed ledger is updated based on the transaction.

6. The method of claim 4, wherein:

the first digital signature is associated with a non-fungible token stored at the distributed ledger, wherein the non-fungible token comprises historical ownership information of the vehicle and is transferable to a new vehicle owner.

7. The method of claim 1, wherein determining that the request to access the vehicle information has been received comprises receiving login credentials and determining whether the received login credentials match login credentials of the user profile.

8. The method of claim 1, wherein the mobile application is implemented at a key fob or a smart phone.

9. A system for securely managing vehicle information, the system comprising:

a server configured to:

generate a first public-private key pair and a second public-private key pair;

generate, based on the first public-private key pair and a vehicle identifier of a vehicle, a first digital signature associated with the vehicle;

generate, based on the second public-private key pair and a mobile application identifier of a mobile application associated with a mobile device operated by a user, a second digital signature associated with the mobile application, wherein the vehicle identifier and the mobile application identifier are associated with a user profile in a database maintained by the server;

transmit the first digital signature and the public key of the first public-private key pair to the vehicle, wherein the first digital signature is stored in a memory module associated with the vehicle;

transmit the second digital signature and the public key of the second public-private key pair to the mobile application, wherein the mobile application facilitates storage of the second digital signature in a local memory of the mobile device;

processing circuitry configured to:

determine that a request to access the vehicle information has been received, wherein the request is associated with the user profile; and permit access to the vehicle information based on the first digital signature and the second digital signature.

10. The system of claim 9, wherein:

the processing circuitry is configured to permit access to the vehicle information based on the first digital signature and the second digital signature by:

receiving a first indication that the vehicle has verified the vehicle identifier associated with the user profile, wherein the verification associated with the first indication is performed using the first digital signature;

receiving a second indication that the mobile application has verified the mobile application associated with the user profile, wherein the verification associated with the second indication is performed using the second digital signature; and permitting access to the vehicle information in response to receiving the first indication and the second indication.

11. The system of claim 9, wherein the server is further configured to:

determine that the user associated with the user profile has selected an option to register for secure management of the vehicle information; and in response to determining that the user associated with the user profile has selected the option to register for secure management of the vehicle information, generate the first public-private key pair and the second public-private key pair.

12. The system of claim 9, wherein the vehicle information is stored at a distributed ledger.

13. The system of claim 12, wherein at least one of the first public-private key pair and the second public-private key pair is usable to execute a transaction associated with the vehicle information on the distributed ledger, and the distributed ledger is updated based on the transaction.

14. The system of claim 12, wherein:
the first digital signature is associated with a non-fungible token stored at the distributed ledger, wherein the non-fungible token comprises historical ownership information of the vehicle and is transferable to a new vehicle owner.

15. The system of claim 9, wherein the server is configured to determine that the request to access the vehicle information has been received by receiving login credentials and determining whether the received login credentials match login credentials of the user profile.

16. The system of claim 9, wherein the mobile application is implemented at a key fob or a smart phone.

17. A non-transitory computer-readable medium having non-transitory computer-readable instructions encoded thereon that, when executed by a processor associated with a server, causes the processor to:
generate a first public-private key pair and a second public-private key pair;
generate, based on the first public-private key pair and a vehicle identifier of a vehicle, a first digital signature associated with the vehicle;
generate, based on the second public-private key pair and a mobile application identifier of a mobile application associated with a mobile device operated by a user, a second digital signature associated with the mobile application, wherein the vehicle identifier and the mobile application identifier are associated with a user profile in a database maintained by the server;
transmit the first digital signature and the public key of the first public-private key pair to the vehicle, wherein the first digital signature is stored in a memory module associated with the vehicle;
transmit the second digital signature and the public key of the second public-private key pair to the mobile application, wherein the mobile application facilitates storage of the second digital signature in a local memory of the mobile device;
determine that a request to access vehicle information has been received, wherein the request is associated with the user profile; and
permit access to the vehicle information based on the first digital signature and the second digital signature.

18. The non-transitory computer-readable medium of claim 17, wherein:
the execution of the instructions to permit access to the vehicle information based on the first digital signature and the second digital signature further causes the processor to:
receive a first indication that the vehicle has verified the vehicle identifier associated with the user profile, wherein the verification associated with the first indication is performed using the first digital signature;
receive a second indication that the mobile application has verified the mobile application associated with the user profile, wherein the verification associated with the second indication is performed using the second digital signature; and
permit access to the vehicle information in response to receiving the first indication and the second indication.

19. The non-transitory computer-readable medium of claim 17, wherein the execution of the instructions further causes the processor to:
determine that the user associated with the user profile has selected an option to register for secure management of the vehicle information; and
in response to determining that the user associated with the user profile has selected the option to register for secure management of the vehicle information, generate the first public-private key pair and the second public-private key pair.

20. The non-transitory computer-readable medium of claim 17, wherein the vehicle information is stored at a distributed ledger.

* * * * *